(No Model.)
C. MILLER.
PIPE WRENCH.
No. 461,032. Patented Oct. 13, 1891.
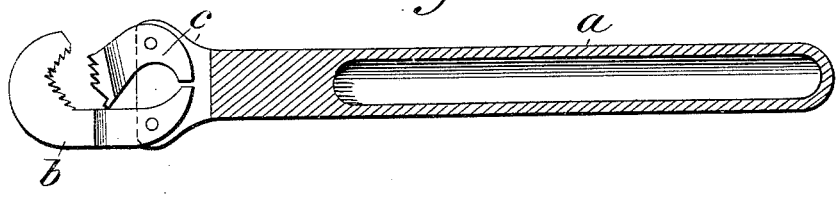
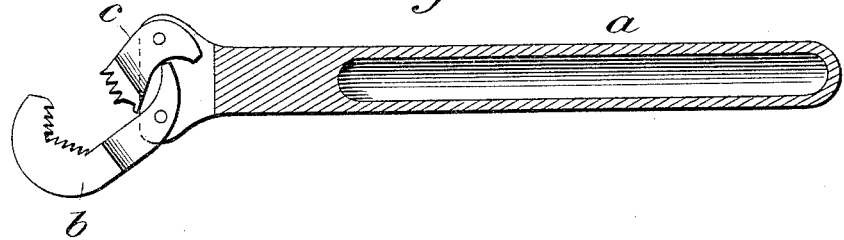
Witnesses
George Tamm
Arthur Miller
Inventor:
Chas. Miller.

UNITED STATES PATENT OFFICE.

CHARLES MILLER, OF WASHINGTON, MISSOURI.

PIPE-WRENCH.

SPECIFICATION forming part of Letters Patent No. 461,032, dated October 13, 1891.

Application filed May 25, 1891. Serial No. 394,071. (No model.)

*To all whom it may concern:*

Be it known that I, CHARLES MILLER, of Washington, in the county of Franklin and State of Missouri, have invented a new and Improved Wrench for Screwing and Unscrewing Pipes or Anything Round; and I do hereby declare that the following is a full and exact description of the said invention.

The nature of my invention consists in a handle, a toothed pawl, and a toothed hook swiveling on pins in one end of the handle, Figures 1 and 2, Fig. 1 showing it from the side, with pawl and hook in, and the manner of operation of pawl and hook when used for different sizes, being the position of the middle between the narrowest and widest opening.

Handle $a$ and $a$, Figs. 1 and 2, can be made hollow for lightness and strength or solid, Fig. 1 showing the pin-holes, and Fig. 2 edge view, showing the tenon-slot into which pawl and hook are inserted, with shanks of pawl and hook.

Fig. 3 shows the widest opening of pawl and hook and the manner of curving of pawl and hook at the opposite end of the teeth. This curving is done for the purpose of making pawl $c$, following the inside line of hook $b$, acting similar to a pair of vise-jaws. Thus it will be seen that as handle $a$ is pulled forward and backward, pawl $c$ and hook $b$ will open and close like a vise, pawl $c$ always bearing on the same point, without regard to small or large diameter, working on without special adjustment whatever. Thus I have constructed a wrench light and strong, simple and convenient, and cheap in manufacturing, beyond an equal.

What I claim as my invention, and desire to secure by Letters Patent, is—

The construction of a tool consisting in handle $a$, pawl $c$, and hook $b$, combined together as a whole in the manner described, and for the purpose set forth.

CHARLES MILLER.

Witnesses:
    GEORGE TAMM,
    ARTHUR MILLER.